United States Patent
Bugenhagen

(10) Patent No.: US 9,509,584 B2
(45) Date of Patent: Nov. 29, 2016

(54) OAM NAME STATE EVENT TRIGGER

(71) Applicant: CenturyLink Intellectual Property LLC, Denver, CO (US)

(72) Inventor: Michael Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 427 days.

(21) Appl. No.: 13/971,217

(22) Filed: Aug. 20, 2013

(65) Prior Publication Data

US 2014/0164602 A1 Jun. 12, 2014

Related U.S. Application Data

(60) Provisional application No. 61/735,328, filed on Dec. 10, 2012.

(51) Int. Cl.
*H04L 12/26* (2006.01)

(52) U.S. Cl.
CPC ........... *H04L 43/10* (2013.01); *H04L 43/0835* (2013.01); *H04L 43/0858* (2013.01); *H04L 43/106* (2013.01)

(58) Field of Classification Search
CPC .................................................. H04L 43/0888
USPC ........................................................ 709/224
See application file for complete search history.

(56) References Cited

U.S. PATENT DOCUMENTS

| | | | | |
|---|---|---|---|---|
| 4,641,304 A * | 2/1987 | Raychaudhuri | .... | H04B 7/18528 370/447 |
| 5,754,947 A * | 5/1998 | Tanabe | ................. | H04W 76/02 455/515 |
| 6,078,572 A * | 6/2000 | Tanno | ............... | H04W 74/0866 370/335 |
| 6,725,270 B1 * | 4/2004 | Yu | ......................... | H04L 12/413 370/230 |
| 7,260,327 B1 * | 8/2007 | Shin | .................... | H04J 14/0212 398/49 |
| 2003/0115321 A1 * | 6/2003 | Edmison | .................. | H04L 1/20 709/224 |
| 2003/0135784 A1 * | 7/2003 | Yamaguchi | ........... | H04L 1/1851 714/18 |
| 2007/0133469 A1 * | 6/2007 | Shin | ...................... | H04W 40/34 370/331 |
| 2007/0147259 A1 * | 6/2007 | Smith | ....................... | H04J 3/14 370/242 |
| 2012/0076013 A1 * | 3/2012 | Cheng | ................. | H04L 12/4641 370/252 |
| 2013/0078848 A1 * | 3/2013 | Kummetz | .............. | H04Q 1/138 439/488 |
| 2013/0329565 A1 * | 12/2013 | Holness | .............. | H04L 43/0811 370/241.1 |

* cited by examiner

*Primary Examiner* — Kevin Bates
*Assistant Examiner* — Chen-Liang Huang
(74) *Attorney, Agent, or Firm* — Swanson & Bratschun, L.L.C.

(57) ABSTRACT

The disclosed embodiments include a method, apparatus, and computer program product for improving network monitoring. For example, in one embodiment, current inaccuracies due to the imperfect counter frame injection error between ingress counters and egress counters is eliminated, by monitoring, using an ingress counter, for a time period that is slightly greater than the time it takes for a packet/frame to pass from one end to the other, for "no packets/frames". In one embodiment, once this no packet time occurs, a signaling event is triggered. A notification is sent from the start of the path counter to the end of the path counter to start counting. A "stop counting/restart counting" signal is then sent from the start of the path counter to the end of the path counter the next time that no packets/frames are observed for the same period.

18 Claims, 4 Drawing Sheets

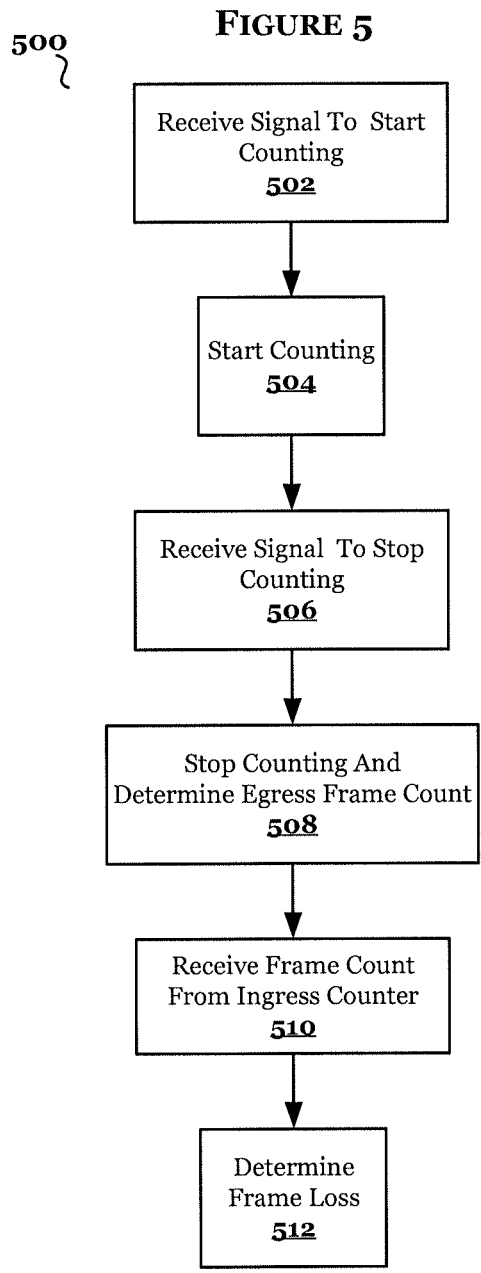

OAM NAME STATE EVENT TRIGGER

CROSS-REFERENCE TO RELATED APPLICATIONS

This application claims priority to U.S. Provisional Patent Application Ser. No. 61/735,328 filed on Dec. 10, 2012 entitled OAM NAME STATE EVENT TRIGGER, the entire teachings of which are incorporated herein.

BACKGROUND OF THE INVENTION

Field of the Invention

The principles of the present invention relate generally to an improved communications system, and in particular, to an improved system and method for monitoring network performance.

Description of the Related Art

Passive monitoring is a technique used to monitor traffic on a network for performance trending and predictive analysis. Passive monitoring practice periodically monitor packet counters at opposite ends of a network, and use "time stamps" to inject counter frames that start and stop measuring frame loss across a link. Typically the goal is to measure packet loss in very low quantities such as $10\text{-}4^{th}$ or 0.0001% packet loss. The existing passive method uses operations, administration and maintenance (OAM) frames to exchange counters continuously with active probes. However, this method is imperfect due to force insertion of a frame even when frames are sequenced back to back. The result is that counter frames are injected imperfectly which results in frame injection error.

Accordingly, the disclosed embodiments seek to provide one or more systems and methods to alleviate the problems related to the above frame insertion issue.

BRIEF SUMMARY OF THE INVENTION

Embodiments of the present invention include an apparatus, method, and computer program product for improving network monitoring. As part of the inventive process, the inventor of the disclosed system and method recognized several issues associated with the current method for monitoring network performance. The first issue is imperfect counter frame injection caused by a counter frame being inserted during a time when frames are sequenced back to back. Second, as higher rate interfaces such as Gig-E and 10 Gig-E can transmit more frames per millisecond than clocking can count, the use of time stamping introduces accuracy issues due to the speed at which frames are transmitted. These two issues make "passive" frame loss very difficult, if not impossible, to track on a broad scale.

Accordingly, the disclosed embodiments seek to provide one or more solutions to the above problems associated with current network monitoring by utilizing a detection and Named Signaling Event (NSE) mechanism to enable accurate passive frame loss counting. For example, in one embodiment, the imperfect counter frame injection error between ingress counters and egress counters is eliminated, by monitoring, using one of the counters (e.g., the ingress counter), for a time period that is slightly greater than the time it takes for a packet/frame to pass from one end to the other, for "no packets/frames". In one embodiment, once this no packet time occurs, a signaling event is triggered. A notification is sent from the start of the path counter to the end of the path counter to start counting. A "stop counting/restart counting" signal is then sent from the start of the path counter to the end of the path counter the next time that no packets/frames are observed for the same period. Using the above process, the frame counting message can be injected into the flow perfectly by sending the frame not at a scheduled time when the line may be to full to send an additional frame, but when there is momentary lack of traffic. Thus, by using the above signaling mechanism, the imperfect counter frame injection error can be eliminated. In some embodiments, the above process for determining a "wait for not traffic" state may be used to exchange or transmit any "named state event" from one end to the far end or next OAM entity.

As an example, the disclosed embodiments include a method performed by a first network device for improving network monitoring. The method includes monitoring; using a processor of the first network device, protocol data units that are being communicated from the first network device to a second network device. The method further includes identifying a first time period when no protocol data units are being communicated from the first network device to the second network device for a period greater than a path delay time. In response to identifying the first time period, the method includes the step of transmitting a first signal from the first network device to the second network device to initiate counting of the protocol data units received at the second network device that are sent from the first network device. The method also includes the step of initiating counting, at the first network device, of the protocol data units that are transmitted to the second network device. The method further identifies a second time period when no protocol data units are being communicated from the first network device to the second network device for the period greater than the path delay time. In response to identifying the second time period, the method includes the step of transmitting a second signal from the first network device to the second network device to terminate counting of the protocol data units received at the second network device. The method terminates counting, at the first network device, of the protocol data units that are transmitted to the second network device following the transmission of the second signal.

In some embodiments, during inactive periods, the ingress counter and/or an egress counter can send a "no frames" message every "y" seconds just to ensure that the system is alive and has a status.

Advantages of the disclosed embodiments include, but are not limited to, lowering the cost of packet/frame performance metrics and can be universally applied to all packet services/networks. Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein:

FIG. 5 illustrates a flow chart depicting a method performed by an egress counter in accordance with a disclosed embodiment.

DETAILED DESCRIPTION

The disclosed embodiments include a system and method for improving network monitoring. In particular, the disclosed embodiments seek to eliminate frame insertion errors in current network monitoring techniques due to the insertion of active OAM frames during live traffic periods.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
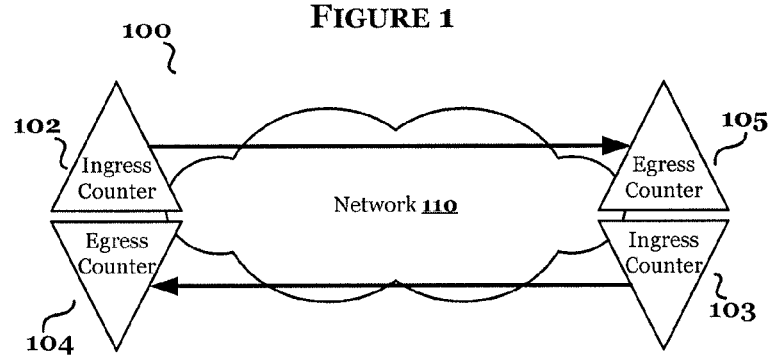
FIG. 1 illustrates a network diagram in accordance with the disclosed embodiments.

FIG. 1 illustrates a network diagram 100 in accordance with the disclosed embodiments. The network diagram 100 includes a network 110. The network 110 may be any type of communication network that is operable to transmit data packets/frames. In one embodiment, the network 110 may be a communication network of a single service provider. Alternatively, the network 110 may include the communication networks of multiple service providers. Still, in certain embodiments, the network 110 may include a combination of one or more of the following networks: a wide area network, a local area network, one or more private networks or public networks including the Internet, one or more cellular data networks, and wireless data networks.

In accordance with the disclosed embodiments, located within the network 110 are one or more ingress counters (102, 103) and egress counters (104, 105). The ingress and egress counters may be components of a device/system and/or one or more individual systems. In one embodiment, each circuit is bi-directional. In one embodiment, packet/frame loss is calculated in each direction. Alternatively, in some embodiments, packet/frame loss may be counted in only one direction. Packet/frame counting may be performed by reading the counter and subtracting the old counter count. Alternative ways of packet/frame counting may also be performed in accordance with the disclosed embodiments.

Figure 2:
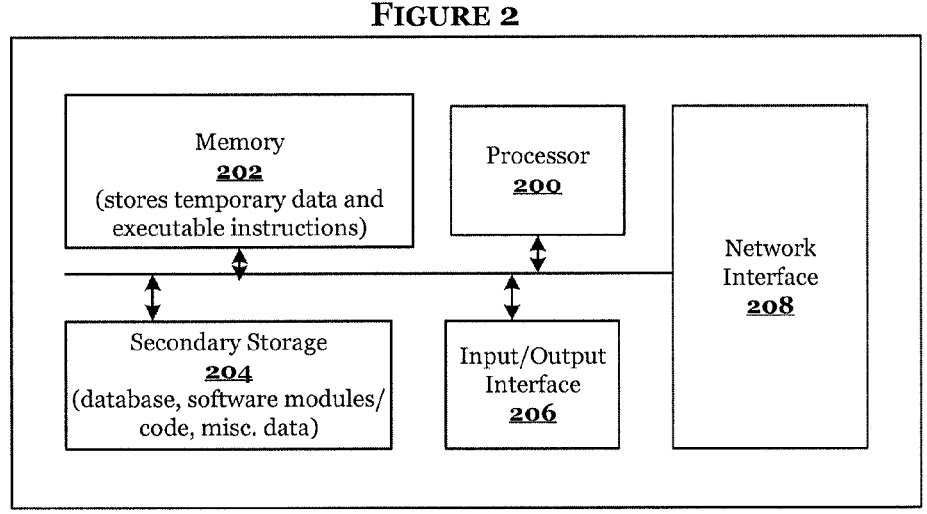
FIG. 2 illustrates a system diagram in accordance with the disclosed embodiments.

Each of the system, as depicted in FIG. 2, may include memory 202 and/or other data storage component 204 for storing instructions and data. In addition, each of the system includes at least one processor 200 for executing instructions in accordance with the disclosed embodiments. The systems also include a network interface 208 for communicating data packets/frames over the network 110. Still, the system may include an input/output interface 206 for enabling one or more peripheral devices to be coupled to the system.

In one embodiment, the ingress and egress counters are placed on the edge, at opposite ends, of the network 110 (e.g., as part of a gateway device or near a gateway device). In one embodiment, the ingress counter counts incoming data packets/frames arriving through the network 110, whereas the egress counters counts data packets/frames leaving through the network 110. Alternatively, in certain embodiments, the ingress counters and egress counters may be placed anywhere within the network 110 to count data packets/frames for determining packet/frame count or packet/frame loss between for a particular portion of the network 110. Still, in certain embodiments, the ingress counters may be located in a first network and the egress counters may be located in a second network for determining data packet/frame loss between the different networks.

Whether data packets or frames are counted is dependent upon which layer of the communication protocol (e.g., using the OSI model or TCP/IP model) the ingress and egress performs the count. For example, in certain embodiments, the ingress and egress counters may be configured to count frames at Layer 2 (i.e., Data Link level of the OSI model). Alternatively, in other embodiments, the ingress and egress counters may be configured to count packets at Layer 3 (i.e., Network level of the OSI model). To maintain consistency, the below description and corresponding drawings will discuss the disclosed embodiments in reference to counting frames. However, as stated above, the disclosed embodiments may similarly count data packets or any other protocol data unit (PDU). A protocol data unit, as used herein, is defined as any chunk of data created and/or labeled by a particular protocol.

Figure 3:
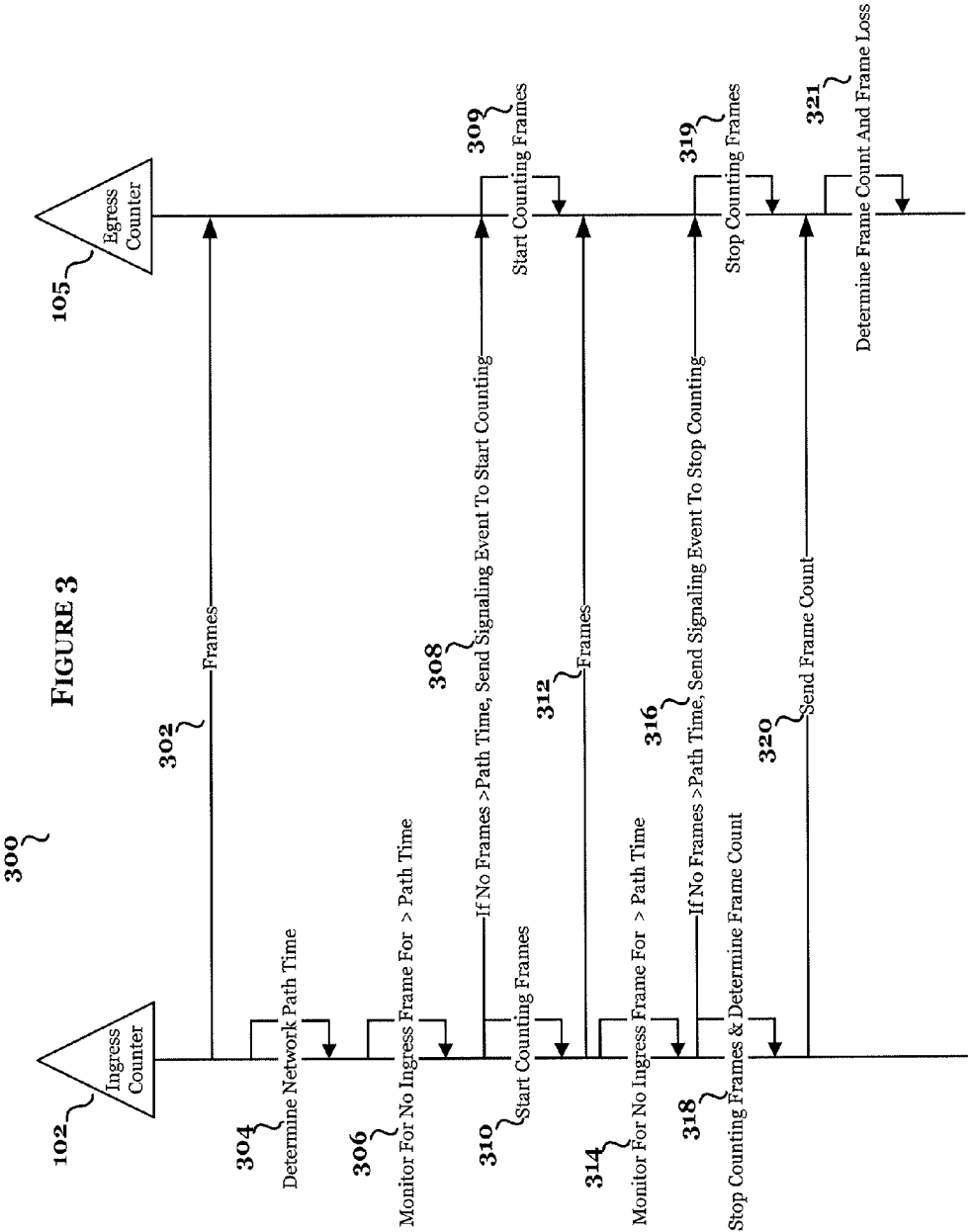
FIG. 3 illustrates a sequence diagram depicting communications between an ingress counter and an egress counter in accordance with a disclosed embodiment.

With reference now to FIG. 3, a sequence diagram 300 depicts communications between the ingress counter 102 and the egress counter 105 for eliminating frame insertion errors in accordance with a disclosed embodiment. As depicted in FIG. 3, frames 202 are routed from the ingress counter 102 to the egress counter 105. In the depicted embodiment, the ingress counter 102 is configured to determine the delay time in the communication path between the ingress counter 102 and the egress counter 105 (i.e., the time it takes for a frame to travel from the ingress counter 102 to the egress counter 105).

In certain embodiments, the ingress counter 102 may determine an average delay time. Alternatively, the delay time may be determined by another device such as, but not limited to, the egress counter 105 or a network controller/management system. The determined delay time would then be passed to the ingress counter 102.

In accordance with the disclosed embodiment, the ingress counter 102 is configured to monitor for a time period that is greater than the delay time in which no frames are being passed from the ingress counter 102 to the egress counter 105 (sequence 206). If this time period occurs, the ingress counter 102 is configured to send a signaling event to the egress counter 105 (sequence 208) to start counting frames that are received after this signaling event (sequence 209). In addition, the ingress counter 102 begins counting frames (sequence 212) that are communicated to the egress counter 105 after this signaling event (sequence 210).

While counting, the ingress counter 102 is configured to monitor for a second time period that is greater than the delay time in which no frames are being passed from the ingress counter 102 to the egress counter 105 (sequence 214). Once this occurs, the ingress counter 102 is configured to send a second signaling event to the egress counter 105 (sequence 216) to stop counting frames (sequence 219). Following the second signaling event, the ingress counter 102 stops counting frames and determines a sent frame count for the period between the first signaling event (sequence 208) and the second signaling event (sequence 216).

In the depicted embodiment, the ingress counter 102 is configured to send the sent frame count to the egress counter 105 (sequence 220). The egress counter 105 determines a received frame count for the period between the first signaling event and the second signaling event (sequence 221).

Using the sent frame count received from the ingress counter 102 and the determined received frame count, the egress counter 105 determines the number of frames that were loss for the period between the first signaling event and the second signaling event.

Alternatively, in other embodiments, the egress counter 105 may send the received frame count to the ingress counter 102 for enabling the ingress counter 102 to determine frame loss. Still, in certain embodiments, both the ingress counter 102 and the egress counter 105 may communicate its respective frame count to a network controller/management system for enabling the network controller to determine frame loss between the ingress counter 102 and the egress counter 105. Based on the frame loss, the network controller, the ingress counter 102, and/or the egress counter 105 may adjust certain communication parameters and/or perform additional network testing/monitoring.

Figure 4:
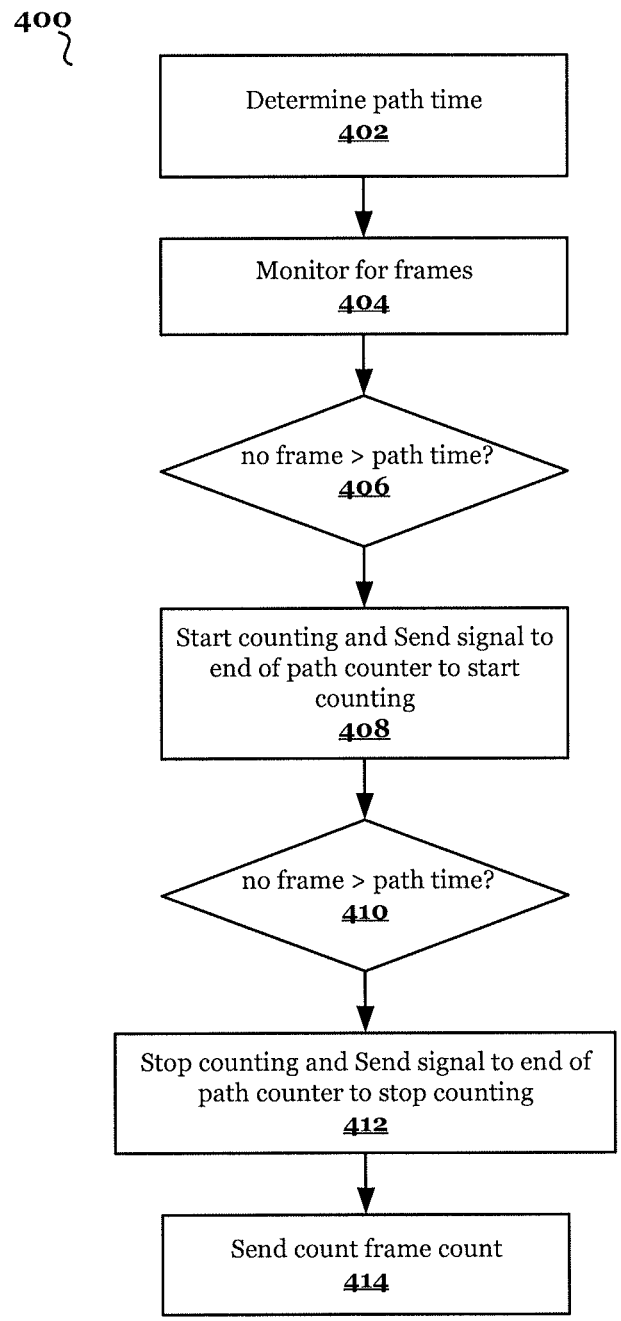
FIG. 4 illustrates a flow chart depicting a method performed by an ingress counter in accordance with a disclosed embodiment.

FIG. 4 illustrates a flow chart depicting a process 400 performed by an ingress counter in accordance with a disclosed embodiment. The process 400 begins, at step 402, by determining the time it takes to communicate a frame from the ingress counter to an egress counter. This may be performed using timestamps at both the ingress counter and the egress counter. The egress counter may be configured to subtract a first timestamp, indicating when a frame was sent from the ingress counter, from a second timestamp indicating when the egress counter received the frame to determine path/delay time. The egress counter may then communicate the delay time to the ingress counter. This process may be repeated to determine an average delay time.

At step 404, the ingress counter monitors for frames that are being passed from the ingress counter to the egress counter. If the ingress counter detects, at step 406, that no frames are being passed from the ingress counter to an egress counter for a time period slightly greater than the path delay time, then the ingress counter, at step 408, sends a signal (or some type of indicator) to the egress counter to start/restart counting frames received from the ingress counter. The reason the time period is slightly greater than the path delay time is to ensure that there are no packets in flight. This slightly greater period can be predetermined by a network operator/tester. Additionally, following the signaling event, the ingress counter will initiate its frame count of frames being passed from the ingress counter to the egress counter.

In some embodiments, the ingress counter may also be configured to notify/ping the egress counter every predetermined time period (e.g., every x seconds) in response to the ingress counter having not passed any frames from the ingress counter to the egress counter within the predetermined time period to ensure that system is alive and has a status. For example, the ingress counter may be configured to send a "no frames message" to the egress counter to notify the egress counter that the ingress counter is functioning. The egress counter may return an acknowledgment message to the ingress counter to indicate receipt of the no frames message and to indicate that the egress counter is also functioning properly. Alternatively, in some embodiments, the egress counter may initiate transmission of the "no frames message" to the ingress counter to notify the ingress counter that the egress counter has not received any frames from the ingress counter within a predetermined time period. In certain embodiments, the ingress counter and/or egress counter may be configured to transmit or issue an alert in response to not receiving the "no frames message" or the acknowledgment message.

In addition, while performing its frame count, the ingress counter, at step 410, will also monitor for a time frame when no frames are being passed from the ingress counter to the egress counter for a time period slightly greater than the path delay time. Once this occurs, the ingress counter, at step 412, will send a second signal to the egress counter to stop its frame count. The ingress counter will stop and determine a sent frame count at step 412. The ingress counter, at step 414, then sends the sent frame count to the egress counter or to some other device for enabling the calculation of frame loss, with process 400 terminating thereafter. Alternatively, the ingress counter may receive a received frame count from the egress counter and perform the calculation of frame loss.

FIG. 5 illustrates a flow chart depicting a process 500 performed by an egress counter in accordance with a disclosed embodiment. The process begins, at step 502, by receiving at the egress counter a first signal from an ingress counter to begin/restart a frame count. In response to receiving the first signal, the egress counter, at step 504, starts/restarts the counting of frames received from the ingress counter. The egress counter continues to count frames until it receives, at step 506, a second signal from the ingress counter. In response to receiving the second signal, the egress counter, at step 508, stops the counting of frames received from the ingress counter and determines a received frame count between the period of receiving the first signal and receiving the second signal. At step 510, the egress counter may receive a sent frame count from the ingress counter. The egress counter, at step 512, determines frame loss by subtracting the received frame count from the sent frame count. In some embodiments, the egress counter may transmit the frame loss value to a network controller and/or to the ingress counter. Similarly, in some embodiments, the egress counter may transmit the received frame count to a network controller and/or to the ingress counter for enabling the device receiving the received frame count to determine frame loss.

Accordingly, the disclosed embodiments solve inaccuracies related to the imperfect counter frame injection error between measurement points by utilizing a detection and notification signaling mechanism (e.g., using a named signaling event) to enable accurate passive frame loss counting. As previously noted, advantages of the disclosed embodiments include, but are not limited to, lowering the cost of frame performance metrics. In addition, the disclosed embodiment may be universally applied to all packet services/networks.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowcharts, sequence diagrams, and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A method for improving network monitoring comprising:
   monitoring, using a processor, protocol data units that are being communicated from a first network device to a second network device;
   determining, with the processor, a path delay time for the protocol data units to be communicated from the first network device to the second network device;
   detecting, with the processor, that no protocol data units are being communicated from the first network device to the second network device for a first time period greater than the path delay time;
   responsive to identifying that no protocol data units have been communicated for the first time period, transmitting a first signal from the first network device to the second network device to initiate a second count by initiating counting of the protocol data units received at the second network device that are sent from the first network device;
   responsive to identifying that no protocol data units have been communicated for the first time period, initiating, at the first network device, a first count by initiating counting of the protocol data units that are transmitted to the second network device;
   detecting, with the processor, that no protocol data units are being communicated from the first network device to the second network device for a second time period greater than the path delay time, wherein the second time period occurs after protocol data units are communicated subsequent to the first time period;
   responsive to identifying that no protocol data units have been communicated for the second time period, transmitting a second signal from the first network device to the second network device to terminate the second count by terminating counting of the protocol data units received at the second network device;
   responsive to identifying that no protocol data units have been communicated for the second time period, terminating, at the first network device, the first count by terminating counting of the protocol data units that are transmitted to the second network device; and
   determining, with at least one of a network management system, the first network device, or the second network device, frame loss by comparing the first count of the protocol data units that are transmitted by the first network device and the second count of the protocol data units that are received by the second network device, during the period between the first time period and the second time period.

2. The method of claim 1, further comprising determining, by the first network device, the path delay time for the protocol data units to be communicated from the first network device to the second network device.

3. The method of claim 1, further comprising determining, by the first network device, a transmitted protocol data units count for a number of protocol data units transmitted by the first network device to the second network device between transmission of the first signal and the second signal.

4. The method of claim 3, further comprising transmitting the transmitted protocol data units count to the second network device.

5. The method of claim 3, further comprising transmitting the transmitted protocol data units count to the network management system.

6. The method of claim 3, further comprising:
   receiving, at the first network device, a received protocol data units count for a number of protocol data units received by the second network device from the first network device between reception of the first signal and the second signal at the second network device, wherein determining frame loss comprises, determining, with the first network device, frame loss by subtracting the received protocol data units count from the transmitted protocol data units count.

7. The method of claim 1, wherein the protocol data units are frames.

8. The method of claim 1, wherein the protocol data units are packets.

9. A system for improving network monitoring, the system comprising:
- a network interface configured to communicate protocol data units over a network;
- memory configured to store computer executable instructions; and
- a processor configured to execute the computer executable instructions to:
  - monitor the protocol data units communicated from the system to a second network device;
  - determine a path delay time for the protocol data units to be communicated to the second network device;
  - detect that no protocol data units are being communicated from the system to the second network device for a first time period greater than the path delay time;
  - responsive to identifying that no protocol data units have been communicated for the first time period, transmit a first signal from the system to the second network device to initiate a second count by initiating counting of the protocol data units received at the second network device;
  - responsive to identifying that no protocol data units have been communicated for the first time period, initiate a first count by initiating counting, at the system, of the protocol data units that are transmitted to the second network device;
  - detect that no protocol data units are being communicated from the system to the second network device for a second time period greater than the path delay time, wherein the second time period occurs after protocol data units are communicated subsequent to the first time period;
  - responsive to identifying that no protocol data units have been communicated for the second time period, transmit a second signal from the system to the second network device to terminate the second count by terminating counting of the protocol data units received at the second network device;
  - responsive to identifying that no protocol data units have been communicated for the second time period, terminate the first count by terminating counting, at the system, of the protocol data units that are transmitted to the second network device; and
  - determine frame loss by comparing the first count of the protocol data units that are transmitted by the first network device and the second count of the protocol data units that are received by the second network device, during the period between the first time period and the second time period.

10. The system of claim 9, wherein the processor is configured to further execute the computer executable instructions to determine a transmitted protocol data units count for a number of protocol data units transmitted by the system to the second network device between transmission of the first signal and the second signal.

11. The system of claim 10, wherein the processor is configured to further execute the computer executable instructions to transmit the transmitted protocol data units count to the second network device.

12. The system of claim 10, wherein the processor is configured to further execute the computer executable instructions to transmit the transmitted protocol data units count to a network management system.

13. The system of claim 10, wherein determining frame loss comprises determining frame loss by subtracting a received protocol data units count corresponding to a number of protocol data units received by the second network device from a transmitted protocol data units count corresponding to a number of protocol data units transmitted by the system to the second network device.

14. The system of claim 9, wherein the protocol data units are frames.

15. The system of claim 9, wherein the protocol data units are packets.

16. A non-transitory computer usable medium having a computer readable program code embodied therein, the computer readable program code comprising instructions to:
- monitor, with a processor, the protocol data units communicated from a first network device to a second network device;
- determine, with the processor, a path delay time for the protocol data units to be communicated from the first network device to the second network device;
- detect, with the processor, that no protocol data units are being communicated from the first network device to the second network device for a first time period greater than the path delay time;
- responsive to identifying that no protocol data units have been communicated for the first time period, transmit, via the first network device, a first signal from the first network device to the second network device to initiate a second count by initiating counting of the protocol data units received at the second network device;
- responsive to identifying that no protocol data units have been communicated for the first time period, initiate, at the first network device, a first count by initiating counting of the protocol data units that are transmitted to the second network device;
- detect, with the processor, that no protocol data units are being communicated from the first network device to the second network device for a second time period greater than the path delay time, wherein the second time period occurs after protocol data units are communicated subsequent to the first time period;
- responsive to identifying that no protocol data units have been communicated for the second time period, transmit, via the first network device, a second signal from the first network device to the second network device to terminate the second count by terminating counting of the protocol data units received at the second network device;
- responsive to identifying that no protocol data units have been communicated for the second time period, terminate, at the first network device, the first count by terminating counting of the protocol data units that are transmitted to the second network device; and
- determine frame loss by comparing the first count of the protocol data units that are transmitted by the first network device and the second count of the protocol data units that are received by the second network device, during the period between the first time period and the second time period.

17. The non-transitory computer usable medium of claim 16, wherein the computer readable program code further comprises instructions to:
- determine a transmitted protocol data units count for a number of protocol data units transmitted by the first network device to the second network device between transmission of the first signal and the second signal;

receive, at the first network device, a received protocol data units count for a number of protocol data units received by the second network device from the first network device between reception of the first signal and the second signal at the second network device;

wherein determining frame loss comprises determining frame loss by subtracting the received protocol data units count from the transmitted protocol data units count.

18. The non-transitory computer usable medium of claim 16, wherein the computer readable program code further comprises instructions to:

determine a transmitted protocol data units count for a number of protocol data units transmitted by the first network device to the second network device between transmission of the first signal and the second signal; and transmit the transmitted protocol data units count to a network management system.

* * * * *